H. Knapp,
Tree Protector.
No. 101,135. Patented Mar. 22, 1870.
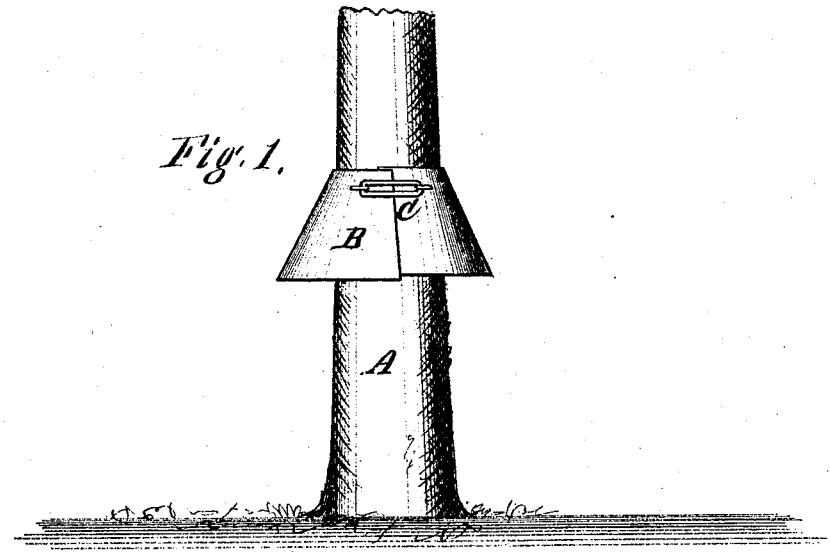
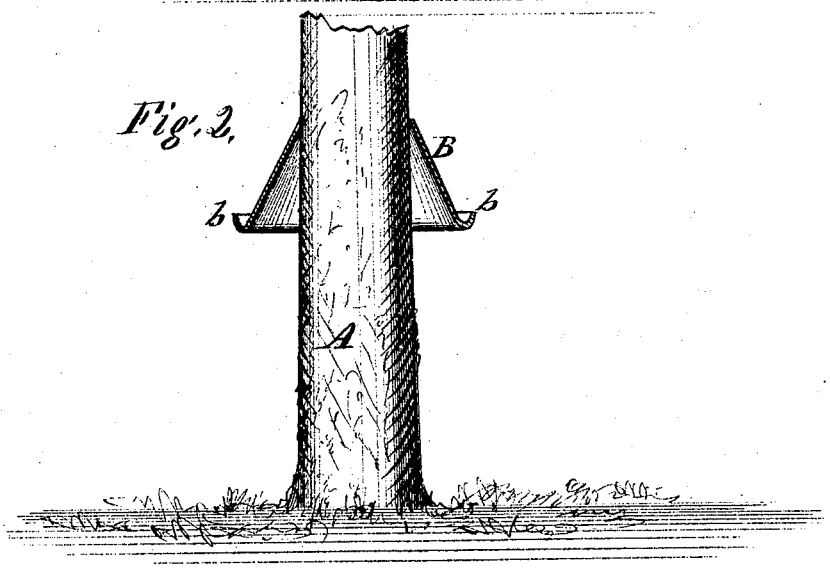

United States Patent Office.

HENRY KNAPP, OF WALWORTH, NEW YORK.

Letters Patent No. 101,135, dated March 22, 1870.

IMPROVEMENT IN TREE-PROTECTORS.

The Schedule referred to in these Letters Patent and making part of the same.

*To all whom it may concern:*

Be it known that I, HENRY KNAPP, of Walworth, in the county of Wayne and State of New York, have invented a new and useful Improvement in Tree-Protectors; and I do hereby declare that the following is a full, clear, and exact description thereof, which will enable those skilled in the art to make and use the same, reference being had to the accompanying drawings forming part of this specification, in which—

Figure 1 is a perspective view of my improvement, and

Figure 2 is a sectional view, showing a slight modification of construction.

Similar letters of reference indicate like parts.

This invention relates to certain improvements in adjustable collars for the bodies of trees, whereby insects, &c., are prevented from ascending the body of a tree; and The invention consists in making the collar of tin, or other flexible sheet metal, so that it will conform readily to different sizes of trees, and in using in connection therewith an elastic fastening, band, or strap, as hereinafter more fully explained.

In the accompanying drawings—

A is the tree body;

B is the collar; and

C is the elastic connecting-strap.

The collar is cut out of tin or other flexible material, in such shape that when closed it shall represent the frustum of a cone, the base forming a skirt which hangs distended around the body of the tree, as shown in fig. 1.

The elastic strap C draws the two ends of the collar together with sufficient tension to make it fit snug around the tree and to hold it securely in position.

For this strap I use a rubber band, which hooks over projections or hooks on the opposite ends of the collar, as shown in fig. 1, but this rubber band can be substituted by a piece of coiled spring wire, with an eye or hook on each end.

These collars are applied to the trees with great readiness, as they are sprung open and placed on the tree, and a fit insured by the elastic strap, which draws the collar snug around the tree, and they are also removed or detached with the same facility.

If a tree should have cavities or inequalities in its bark, the clasping edge of the collar is forced or bent into said cavities with a piece of wood, so that a correct fit is made.

These collars are made at a very light cost, and can be of the largest size by seaming together the pieces of tin. The lower edge can be turned up slightly, to hold some repulsive compound or liquid, as shown in fig. 2, but this is not necessary for protection against the canker-worm, for which the device is mainly intended to be used.

I do not claim, broadly, a tree-protector provided with an elastic fastening; but,

Having thus described my invention,

What I claim as new, and desire to secure by Letters Patent, is—

The application of the protector B, made as herein described, to the body of the tree, so as not to touch the ground, the upper edge fitting closely around the tree, and the lower part flaring out from the same, as specified and represented.

The above specification of my invention signed by me this 7th day of December, 1869.

HENRY KNAPP.

Witnesses:
C. E. WARNER,
F. A. MORLEY.